United States Patent Office 3,178,389
Patented Apr. 13, 1965

3,178,389
NON-SCORCHING CURABLE CARBOXYLIC POLYMER COMPOSITIONS
Victor L. Hallenbeck, Brecksville, Ohio, assignor to The B. F. Goodrich Company, New York, N.Y., a corporation of New York
No Drawing. Filed Apr. 19, 1962, Ser. No. 188,875
5 Claims. (Cl. 260—41.5)

This invention relates to non-scorching, heat curable carboxyl containing polymer compositions and more particularly pertains to non-scorching heat curable compositions comprising a major proportion of a polymeric carboxyl containing elastomeric or plastic material and a minor proportion of (1) a polyvalent metal alcoholate and (2) polyvalent metal oxide.

The curing of carboxyl containing polymers by the condensation of the carboxyl groups with a polyvalent metal oxide is well known in the art. See for instance U.S. Patents 2,649,439; 2,662,874; 2,724,707 and 2,961,348 wherein the polyvalent metal oxide cure of various carboxyl containing plastic and rubbery polymers is disclosed. It is also well known that the salt formation reaction between a polyvalent metallic cation and a carboxyl-containing polymer is rapid and vigorous compared to, for example, sulfur vulcanization of natural and synthetic rubbers, and will occur to some extent when an intimate mixture of the polyvalent metal cation and the carboxyl-containing polymer are allowed to stand at ordinary temperatures. Because of this premature cure or scorching tendency it has been necessary to alter the normal rubber compounding procedure and to intermix the carboxyl containing polymer and the metal oxide rapidly at temperatures preferably below 200° F. and subsequent cure must be carried out without too much delay because of the aforementioned room temperature cure which takes place.

There has been a need for a method for premixing masterbatches of carboxyl containing polymer, polyvalent metal curing agent and other compounding ingredients, reinforcing agents and the like, to give a stock which can be stored for long periods of time at ordinary temperatures and can readily be subsequently heated, softened, melted, calendered, etc. with little or no scorching and cured rapidly at higher temperatures to give products having desirable physical properties. If such nonscorching masterbatches were available it would be possible for rubber manufacturers, for instance, to prepare them in conventional large scale rubber mixers and the masterbatch could then be supplied to the smaller fabricators who would only have to mold and cure the final article. The economic advantages of the foregoing are quite obvious.

It is an object, therefore, to provide a plastic polymer stock comprising a carboxyl containing polymer and a compound having a polyvalent metal ion available for curing which is stable, non-scorching at ordinary temperatures and even at elevated temperatures which are below the cure temperature. Another object is the provision of a novel method for preparing the foregoing stable, non-scorching stocks. Still another object is the provision of a method for preparing the aforementioned compounds having a polyvalent metal ion available for curing.

That the foregoing and other objects are accomplished by the present invention will become evident to those skilled in the art from a reading of the following description and examples.

The use of sulfide coated and phosphate coated polyvalent metal compounds for the achievement of many of the foregoing objects is fully disclosed and claimed in the copending U.S. patent application of Victor L. Hallenbeck and David Craig, Serial No. 111,439, filed May 22, 1961, and that of Victor L. Hallenbeck, Serial No. 130,499, filed August 10, 1961.

I have discovered a heat curable, non-scorching novel composition comprising a major proportion of a plastic carboxyl containing polymer and a minor proportion of (1) a polyvalent metal alcoholate and (2) polyvalent metal oxide.

The plastic carboxyl containing polymers useful in this invention include those resulting from the interpolymerization of one or more carboxylic monomers with one or more other monomers copolymerizable therewith, the polymerization of monomers having groups which are hydrolyzable to carboxyl groups or those resulting from the reaction of a carboxylating agent or carboxyl supplying reagent with a plastic or rubbery polymer which does not contain carboxyl groups.

Carboxylic interpolymers embodied herein are those resulting from the polymerization of a minor amount of carboxyl containing monomer with a major amount of one or more other monomers copolymerizable therewith. The olefinically unsaturated carboxylic acids are preferred as carboxyl containing monomers and the monomers copolymerizable therewith include conjugated dienes, acrylate esters, methacrylate esters, vinyl esters, monoolefins, vinyl cyanides, vinyl aromatic compounds, vinyl halides, vinyl ethers, maleate esters, fumarate esters, and the like.

The olefinically unsaturated carboxylic acids which are interpolymerized to give carboxyl polymers embodied herein are characterized as possessing one or more olefinic carbon-to-carbon double bonds and one or more carboxyl groups, that is, monocarboxyl and polycarboxyl, monoolefinic and polyolefinic acids including, for example, such widely divergent materials as acrylic acid, the alpha-alkyl acrylic acids, crotonic acid, beta-acryloxy propionic acid, alpha- and beta-vinyl acrylic acid, alpha, beta-isopropylidene propionic acid, sorbic acid, cinnamic acid, maleic acid, oleic acid, undecylenic acid, ricinoleic acid, linoleic acid, linolenic acid and others. Better results are obtained by the utilization of one or more olefinically-unsaturated carboxylic acids containing at least one activated olefinic carbon-to-carbon double bond, that is, an acid containing an olefinic double bond which readily functions in an addition polymerization reaction because of the olefinic double bond being present in the monomer molecule either in the alpha-beta position with respect to a carboxyl group thusly —CH=CH—COOH or attached to a terminal methylene grouping thusly $CH_2=C<$.

Illustrative alpha, beta-olefinically unsaturated carboxylic acids within the above-described preferred class include maleic acid, fumaric acid, itaconic acid, citraconic acid, mesaconic acid, crotonic acid, alpha-butyl crotonic acid, angelic acid, hydrosorbic acid, cinnamic acid, m-chloro cinnamic acid, p-chloro cinnamic acid, umbellic acid, beta-benzal acrylic acid, and other monoolefinic monocarboxylic acids; sorbic acid, alpha-methyl sorbic acid, alpha-ethyl sorbic acid, alpha-chloro sorbic acid, alpha-bromo sorbic acid, beta-chloro sorbic acid, alpha-, beta- or gamma-, epsilon-dimethyl sorbic acid, alpha-methyl-gamma-benzal crotonic acid, beta-(2-butene) acrylic acid, 2,4-pentadienoic acid, 2,4,6-octatrienoic acid, 2,4,6,8-decatrienoic acid, 1-carboxyl-1-ethyl-4-phenyl butadiene-1,3,2,6-dimethyl decatrien-(2,6,8)-oic-10 acid, alpha, beta-isopropylidine propionic acid having the structure

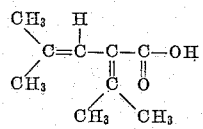

alpha-vinyl cinnamic acid, alpha-isopropenyl-furfural acetic acid, alpha-isopropenyl-cinnamyl acrylic acid, and other polyolefinic monocarboxylic acids; hydromuconic acid, glutaconic acid, and other monoolefinic polycarboxylic acids; 3-carboxy-pentadiene-(2,4)-oic-1, muconic acid, and other polyolefinic polycarboxylic acids.

Olefinically unsaturated carboxylic acids containing the $CH_2=C<$ grouping include acrylic acid, alpha-chloro acrylic acid, methacrylic acid, ethacrylic acid, alpha-isopropylidene acrylic acid, alpha-styryl acrylic acid, beta-vinyl acrylic acid, alpha-vinyl acrylic acid, beta-acryloxy acetic acid, and others.

Monomers copolymerizable with the foregoing carboxylic monomers which are useful in the interpolymers embodied herein include the open chain, aliphatic dienes including the butadiene-1,3 hydrocarbons such as butadiene-1,3 itself, 2-methyl butadiene-1,3 (isoprene), 2,3-dimethyl butadiene-1,3, piperylene, 2-neopentyl butadiene-1,3 and other hydrocarbon homologues of butadiene-1,3 and in addition the substituted dienes such as 2-chloro butadiene-1,3, 2-cyano butadiene-1,3, the straight- and branched-chain conjugated hexadienes and others. The butadiene-1,3 hydrocarbons and butadiene-1,3 in particular, because of their ability to produce stronger and more desirable polymers are much preferred.

Also included as monomers copolymerizable with the foregoing carboxylic monomers in the formation of carboxyl containing plastic and rubbery polymers embodied herein are monoolefinic monomers including acrylate esters such as methyl acrylate, ethyl acrylate, the propyl acrylates, the butyl acrylates, the amyl acrylates, the hexyl acrylates and acrylate esters in general wherein the alcohol moiety is composed of a hydrocarbon group having from 1 to 18 carbon atoms; the methacrylate esters such as methyl methacrylate, ethyl methacrylate, cyclohexyl methacrylate, phenyl methacrylate and methacrylate esters in general wherein the alcohol moiety is composed of a hydrocarbon group having from 1 to 18 carbon atoms; the vinyl halides such as vinyl chloride, vinyl bromide, vinyl fluoride, vinyl iodide, vinylidene chloride, tetrafluoro ethylene, chloro trifluoro ethylene, and the like; the vinyl cyanides such as acrylonitrile, methacrylonitrile, vinylidene cyanide, alpha-cyano ethyl acrylate, maleic nitrile, and the like; the vinyl aromatic monomers such as styrene, alpha-methyl styrene, the vinyl toluenes, the vinyl xylenes, vinyl biphenyl, vinyl naphthalene and the like; the allyl esters such as allyl acetate, allyl butyrate, methallyl acetate and the like; the vinyl esters such as vinyl acetate, vinyl propionate, vinyl butyrate, vinyl stearate, vinyl benzoate, isopropenyl acetate, isopropenyl laurate, and the like; the vinyl ethers such as vinyl methyl ether, vinyl ethyl ether vinyl 2-ethyl hexyl ether and the like; vinyl pyridine, isobutylene, ethylene, propylene and the like; the allyl ethers such as methyl allyl ether, ethyl methallyl ether, and others.

Carboxyl-containing polymers disclosed in U.S. Patents 2,649,439; 2,662,874; 2,724,707 and 2,849,426 are all useful in the instant invention. The polymers containing from 0.001 to 0.30 chemical equivalents of —COOH per 100 parts of polymer (ephp.) are predominantly plastic in nature and are adapted to produce rubbery elastic compositions when condensed with a polyvalent metallic oxide. Polymers containing from 0.02 to 0.20 ephp. of carboxyl are preferred for the production of elastomeric metallo-carboxylates having the best balance of properties while those containing from 0.02 to 0.10 ephp. of carboxyl are preferred for the production of strong elastic compositions having most excellent low temperature flexibility.

The polyvalent metal alcoholates embodied herein are those having the structure $M(OR)_n$ wherein R is a hydrocarbon group having from 1 to 12 carbon atoms, M is a metal of Groups II, III and IV of the long form of the Mendeléeff Periodic Table and $n$ is a number equal to the valence of M. Representative alcoholates within the foregoing class are magnesium methoxide, magnesium ethoxide, the magnesium propoxides, aluminum methoxide, aluminum ethoxide, aluminum isopropoxide, aluminum dodecoxide, aluminum phenolate as well as the alcoholates of zirconium, tin and calcium. More preferred alcoholates are those having the foregoing structure wherein R represents an alkyl group having from 1 to 6 carbon atoms, and M is a member of the group consisting of aluminum and magnesium. Not included within the scope of the present invention are the alcoholates of monovalent metals such as the lithium, sodium, potassium, rubidium and cesium alcoholates.

The polyvalent metal compounds useful in the present invention which are used in conjunction with the aforementioned polyvalent metal alcoholates are the oxides of zinc, magnesium, cadmium, calcium, titanium, aluminum, barium, strontium, copper(ic), cobalt(ic), tin and others. Specifically included are zinc oxide, calcium oxide, cadmium oxide, magnesium oxide, dibutyl tin oxide, lead oxide, barium oxide, cobalt oxide, tin oxide, strontium oxide, and others. In addition many polyvalent metal hydroxides such as calcium hydroxide, cadmium hydroxide, zinc hydroxide, barium hydroxide and others are utilizable. Similarly, carboxylic acid salts of the aforementioned polyvalent metals are meant to be included in the compositions of this invention. Preferred are the polyvalent metal oxides and zinc oxide is most preferred in this invention.

The polyvalent metal alcoholate and the other polyvalent metal compound are admixed with the carboxyl containing polymer in any conventional manner such as by mill-mixing, in a Banbury or other type of internal mixer, by mixing an aqueous dispersion of the polyvalent metal alcoholate and polyvalent metal oxide with a carboxyl containing polymer latex or dispersion and precipitating the mixed dispersion and the like. Similarly the polyvalent metal alcoholate and polyvalent metal oxide may be dispersed in a solution of the carboxyl-containing polymer in any organic solvent for the said polymer and the mixture may be coagulated or deposited as a film upon evaporation of the solvent. In mixing the polymer with the polyvalent metal alcoholate and the polyvalent metal oxide, mastication of the mixture should be continued until the resulting mixture is homogeneous. Conventional softeners, plasticizers, curing agents, mixing aids, reinforcement pigments such as carbon black and siliceous materials may be incorporated into the compositions embodied herein.

The proportions of zinc oxide, for example, required for efficient cure of the compositions embodied herein will vary, of course, depending upon the particular nature of the interpolymerized acid content (or —COOH content) of the polymer. Amounts of curing agent, such as zinc oxide, being equivalent to ½ the carboxyl content of the polymer when used in conjunction with polyvalent metal alcoholate produce curable, non-scorching compositions. For optimum results the amount of curing agent, such as zinc oxide, should be at least equivalent chemically to the —COOH content of the polymer. Since excess curing agent does not have an adverse effect on the cured composition, it is generally preferred to utilize amounts of curing agent in excess of stoichiometrical proportions and preferably twice or more stoichiometrical amounts. Generally, however, amounts of curing agent varying from 1 to 30% based on the weight of carboxylic polymer will be found to be sufficient with amounts from 4 to 20% by weight being preferred. The amount of polyvalent metal alcoholate used is conveniently expressed in terms of the amount of curing agent, such as zinc oxide, used. Generally it is preferred to use about equal weight proportions of the polyvalent metal alcoholate and the polyvalent metal curing agent. It is more preferred to use an amount of polyvalent metal alcoholate which is substantially chemically equivalent to the curing agent. Slightly more or slightly less than a chemical equivalent weight of the polyvalent metal alcoholate may be used without detracting from the non-scorching or the curable properties of the compositions embodied herein.

The following examples wherein the amounts of ingredients are given in parts by weight unless otherwise indicated will illustrate the compositions and process of this invention.

Example I

Compounded rubber stocks were prepared from the following general recipe:

| | |
|---|---|
| Rubbery interpolymer of 67 butadiene–27 acrylonitrile–6 methacrylic acid having 0.0675 ephr. of —COOH and a Mooney viscosity of about 60 | 100. |
| Aluminum isopropoxide | Variable. |
| Zinc oxide | Variable. |
| Carbon black (FEF) | 40. |

The ingredients of each recipe were mill-mixed to a homogeneous stock at a mill roll temperature of about 150° F. Curometer tests were carried out on one gram buttons of the foregoing stocks at 250° F. and at 310° F. and the results are given below. The curometer test was run for a maximum of 40 minutes at any given temperature.

| | A | B | C | D | E | F |
|---|---|---|---|---|---|---|
| Aluminum isoproproxide | 0 | 5 | 0.6 | 1.2 | 2.4 | 5.0 |
| Zinc oxide | 5 | 0 | 5.0 | 5.0 | 5.0 | 5.0 |
| 250° F. (min. to scorch) | 0 | >40 | 7.5 | 7.0 | 10.5 | 19.0 |
| 310° F. (min. to scorch) | 0 | >40 | 1.0 | 1.5 | 2.0 | 3.0 |

Milled stocks of each of the foregoing recipes were cured at 310° F. for 45 minutes. The resulting vulcanizates were found to have the following properties:

| | A | B | C | D | E | F |
|---|---|---|---|---|---|---|
| Compression set (70 hrs.), percent: | | | | | | |
| Room temperature | 80 | 41 | 83 | 80 | 80 | 68 |
| 212° F | 98 | 83 | 100 | 100 | 100 | 94 |
| Pico abrasion [1] | 450 | 61 | 575 | 702 | 684 | 450 |
| Stress-strain-Room temp.: | | | | | | |
| Tensile, p.s.i | 4,300 | 950 | 4,100 | 4,000 | 4,000 | 3,600 |
| 300 modulus | 3,200 | 500 | 2,900 | 2,850 | 2,750 | 2,720 |
| Elongation, percent | 490 | 525 | 450 | 440 | 460 | 450 |

[1] The Pico abrasion values are relative to a natural rubber compound (control) which is given the value of 100.

It is apparent from the foregoing data that aluminum isopropoxide alone gives a very poor cure (B) and that the combinaation of aluminum isopropoxide plus zinc oxide gives a non-scorching stock which can be cured at normal cure temperatures to a vulcanizate which is comparable to that obtained when zinc oxide is used alone in the conventional cure.

When 5 parts of zinc oxide and 6.8 parts of magnesium ethoxide were used in the above recipe a stock was obtained which had a curometer scorch time of 8 minutes at 250° F. and 2 minutes at 310° F. Substitution of sodium ethoxide for the aluminum isopropoxide in the foregoing recipe resulted in no retardation of scorch time over that observed for the control (A).

Example II

The procedures given in Example I were followed employing the following general recipe:

| | |
|---|---|
| Rubbery interpolymer of Example I | 100. |
| Stearic acid | 1.0. |
| Aluminum isopropoxide | Variable. |
| Zinc oxide | Variable. |
| Carbon black (FEF) | 40. |
| Tetramethylthiuram disulfide | 3.5. |

The stocks were mixed homogeneously and the products were found to have the following properties in the curometer test.

| | A | B | C | D | E | F |
|---|---|---|---|---|---|---|
| Aluminum isopropoxide | 0 | 5.0 | 0.6 | 1.2 | 2.4 | 5.0 |
| Zinc oxide | 5.0 | 0 | 5.0 | 5.0 | 5.0 | 5.0 |
| 250° F. (min. to scorch) | 3 | 40 | 2.0 | 4.0 | 5.5 | 10.5 |
| 310° F. (min. to scorch) | 0.5 | 6.0 | 1.0 | 0.5 | 1.0 | 1.5 |

Samples of stocks prepared from the foregoing recipes were cured at 310° F. for 45 minutes and they were found to have the following physical properties:

| | A | B | C | D | E | F |
|---|---|---|---|---|---|---|
| Compression set (70 hrs.), percent: | | | | | | |
| Room temperature | 31 | 24 | 47 | 32 | 25 | 19 |
| 212° F | 42 | 77 | 63 | 55 | 53 | 52 |
| Pico abrasion | 327 | 114 | 347 | 372 | 429 | 360 |
| Stress-strain, Room temp.: | | | | | | |
| Tensile, p.s.i | 3,900 | 2,700 | 3,950 | 4,120 | 3,900 | 3,700 |
| 300% Modulus, p.s.i | 2,900 | 2,200 | 2,880 | 3,320 | 3,150 | 3,300 |
| Elongation, percent | 440 | 450 | 440 | 390 | 425 | 330 |

The substitution of magnesium ethoxide (6.8 parts) for aluminum isopropoxide in a recipe having 5 parts of zinc oxide as shown above gave a stock which had a scorch time at 250° F. of 8 minutes and at 310° F. of 1.5 minutes in the curometer test.

Example III

The procedures set forth in the preceding examples were followed employing the following general recipe:

| | |
|---|---|
| Rubbery copolymer of 92–butadiene–8–methacrylic acid having 0.105 ephr. of —COOH and a Mooney viscosity of about 55 | 100. |
| Aluminum isopropoxide | Variable. |
| Zinc oxide | 5.0. |
| Carbon black | 45. |
| Processing oil (Sundex 53) | 5. |

The ingredients of each recipe were mill-mixed and the resulting homogeneous stocks were found to have the following scorch time in the curometer test.

| | A | B | C |
|---|---|---|---|
| Aluminum isopropoxide | 0 | 2.5 | 5 |
| 250° F. (min. to scorch) | 3.0 | 9.0 | 18.0 |
| 310° F. (min. to scorch) | 0 | 2.0 | 2.5 |

Stocks cured at 310° F. for 45 minutes had the following properties:

| | A | B | C |
|---|---|---|---|
| Compression set (70 hrs.), percent: | | | |
| Room temperature | 79 | 77 | 75 |
| 212° F | 92 | 91 | 91 |
| Pico abrasion | 573 | 476 | 485 |
| Stress-strain, Room temp.: | | | |
| Tensile, p.s.i | 3,100 | 3,250 | 3,250 |
| 300% Modulus, p.s.i | 1,650 | 2,050 | 2,080 |
| Elongation, percent | 350 | 315 | 315 |

The substitution of 6.8 parts of magnesium ethoxide for aluminum isopropoxide in the foregoing recipe gave a stock which had curometer scorch times of 9 minutes at 250° F. and 2 minutes at 310° F.

Example IV

The procedures set out in Example III were followed employing the following recipe:

| | |
|---|---|
| Rubbery copolymer of Example III | 100. |
| Stearic acid | 3.0. |

| | |
|---|---|
| Aluminum isopropoxide | Variable. |
| Zinc oxide | 5.0. |
| Processing oil | 5.0. |
| Carbon black | 45.0. |
| Di-2-benzothiazyl disulfide | 1.0. |
| Sulfur | 2.0. |

Ingredients of the foregoing recipe were mixed on a mill until homogeneous and the resulting stocks were tested in the curometer.

| | A | B | C | D |
|---|---|---|---|---|
| Aluminum isopropoxide | 0 | 2.5 | 5.0 | 8.0 |
| 250° F. (min. to scorch) | 0.5 | 2.5 | 7 | 13 |
| 310° F. (min. to scorch) | 0 | 0.5 | 2 | 3 |

Stocks of the above type were cured at 310° F. for 45 minutes and the resulting vulcanizates were found to have the following physical properties:

| | A | B | C | D |
|---|---|---|---|---|
| Compression set, (70 hrs.), percent: | | | | |
| Room temperature | 46 | 39 | 31 | 29 |
| 212° F | 84 | 81 | 75 | 76 |
| Pico abrasion | 365 | 280 | 467 | 630 |
| Stress-strain, Room temperature: | | | | |
| Tensile, p.s.i | 3,100 | 2,650 | 3,180 | 3,400 |
| 200% Modulus, p.s.i | 2,200 | 2,250 | 3,000 | 2,620 |
| Elongation, percent | 260 | 250 | 215 | 250 |

The substitution of 6.8 parts of magnesium ethoxide for the aluminum isopropoxide in the above recipe gave a stock having curometer scorch time of 9.5 and 2.5 minutes at 250° F. and 310° F. respectively.

*Example V*

Solutions of a carboxylic polymer were prepared by dissolving 100 parts of the interpolymer described in Example I in 400 parts of methyl ethyl ketone. In some cases the interpolymer contained aluminum isopropoxide or zinc oxide or both as indicated in the table below. In these cases the aluminum isopropoxide or zinc oxide or both were milled into the rubbery interpolymer before the interpolymer was dissolved in the methyl ethyl ketone. The solutions were maintained at room temperature during this test. The Brookfield viscosities of the resulting solutions were determined at the time intervals shown below.

| | A | B | C | D |
|---|---|---|---|---|
| Aluminum isopropoxide | 5.0 | 5.0 | 0 | 0 |
| Zinc oxide | 5.0 | 0 | 5.0 | 0 |
| Viscosity at beginning (cps.) | 1,030 | 1,500 | 950 | 1,150 |
| Viscosity after 2 days | 1,000 | 1,500 | 1,100 | 1,100 |
| Viscosity after 9 days | 1,050 | 1,500 | 1,550 | 1,050 |
| Viscosity after 23 days | 1,300 | 1,900 | 7,900 | 1,050 |
| Viscosity after 53 days | 1,300 | 2,150 | 33,000 | 1,050 |

*Example VI*

The procedures of Example I were followed using 5.0 parts of zinc oxide and variable amounts of aluminum ethoxide. The ingredients of each recipe were mill-mixed and the resulting homogeneous stocks were found to have the following scorch times in the curometer test.

| | A | B | C | D |
|---|---|---|---|---|
| Aluminum ethoxide | 0. | 1.2 | 2.4 | 5.0 |
| 250° F. (min. to scorch) | 4.5 | 7.3 | 8.0 | 9.0 |
| 310° F. (min. to scorch) | 1.5 | 1.5 | 2.0 | 1.5 |

Stocks cured at 310° F. for 45 minutes had the following properties:

| | A | B | C | D |
|---|---|---|---|---|
| Pico abrasion | 388 | 380 | 380 | 385 |
| Stress-strain, Room temperature: | | | | |
| Tensile, p.s.i | 4,200 | 4,000 | 3,900 | 4,200 |
| 300% Modulus, p.s.i | 2,030 | 2,380 | 1,980 | 1,880 |
| Elongation, percent | 515 | 375 | 425 | 420 |

I claim:
1. A plastic rubbery composition rapidly curable to the elastic rubbery condition by heating to temperatures above 250° F., and having the ability to be stored and processed at temperatures below 250° F. without premature curing, said composition comprising (A) a plastic rubbery polymer of a butadiene-1,3 hydrocarbon containing from 0.001 to 0.30 chemical equivalents of carboxyl groups per 100 parts of polymer, (B) a polyvalent metal oxide in an amount from ½ to 2 times that which is chemically equivalent to the carboxyl content of (A), and (C) a metal alcoholate of the formula $M(OR)_n$ wherein M is a polyvalent metal of Groups II to IV of the Mendeléeff Periodic Table, R is a hydrocarbon group having from 1 to 6 carbon atoms and $n$ is equal to the valence of M, in an amount substantially chemically equivalent to said amount of (B).

2. A plastic rubbery composition rapidly curable to the elastic rubbery condition by heating to temperatures above 250° F. and having the ability to be stored and processed at temperatures below 250° F. without premature curing, said composition comprising (A) about 100 parts by weight of a plastic rubbery interpolymer of butadiene-1,3 and an alpha-beta unsaturated carboxylic acid of the formula

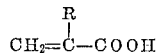

$$CH_2=\overset{R}{\underset{|}{C}}-COOH$$

wherein R is selected from the class consisting of hydrogen, methyl and ethyl, said interpolymer containing from about 0.02 to 0.20 chemical equivalents of carboxyl groups derived from said acid per 100 parts of polymer, (B) about 5 parts by weight of zinc oxide, and (C) about 0.6 to about 8 parts by weight of a metal alcoholate selected from the class consisting of alkoxides of aluminum and magnesium having from 1 to 6 carbon atoms in each alkoxy group.

3. A plastic rubbery composition in accordance with claim 2 in which the plastic rubbery interpolymer (A) is a three-component interpolymer of about 67 parts of butadiene-1,3, about 27 parts of acrylonitrile and about 6 parts of methacrylic acid and (C) is about 0.6 to about 5 parts by weight of aluminum isopropoxide.

4. A plastic rubbery composition in accordance with claim 2 in which the plastic rubbery interpolymer is a two-component interpolymer of about 92 parts of butadiene-1,3 and about 8 parts of methacrylic acid and (C) is about 2.5 to 8.0 parts by weight of aluminum isopropoxide.

5. In the method of producing a cured elastic rubbery polymer of a butadiene-1,3 hydrocarbon containing from 0.001 to 0.30 chemical equivalents of carboxyl groups per 100 parts of polymer by the steps of mixing said polymer in the uncured plastic condition with zinc oxide in an amount from ½ to 2 times that which is chemically equivalent to the carboxyl content of said polymer and then heating the resulting composition above 250° F. the improvement which consists in mixing with said polymer and said zinc oxide prior to said heating a metal alcoholate selected from the class consisting of alkoxides of aluminum and magnesium having from 1 to 6 carbon atoms in each alkoxy group, in an amount substantially chemically equivalent to said amount of said zinc oxide, thereby to prevent premature curing of said polymer during storage and processing prior to said heating step without adversely affecting the properties of said cured elastic rubbery polymer.

References Cited by the Examiner

UNITED STATES PATENTS

| | | | |
|---|---|---|---|
| 2,669,550 | 2/54 | Brown | 260—80.7 XR |
| 2,767,158 | 10/56 | Schlenker et al. | 260—45.5 |

FOREIGN PATENTS

| | | |
|---|---|---|
| 910,335 | 4/54 | Germany. |
| 722,045 | 1/55 | Great Britain. |
| 852,936 | 11/60 | Great Britain. |
| 875,954 | 8/61 | Great Britain. |
| 570,434 | 12/57 | Italy. |

MORRIS LIEBMAN, *Primary Examiner.*